Figure 1:
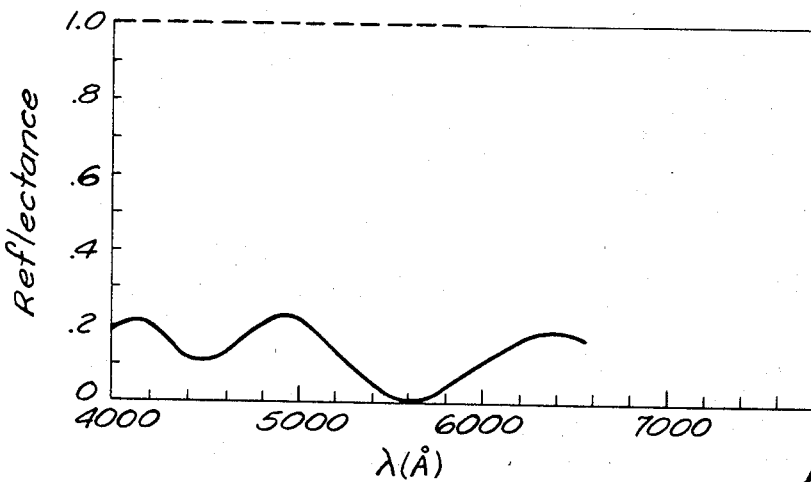

United States Patent [19]

Alfrey, Jr. et al.

[11] 3,711,176

[45] Jan. 16, 1973

[54] HIGHLY REFLECTIVE THERMOPLASTIC BODIES FOR INFRARED, VISIBLE OR ULTRAVIOLET LIGHT

[75] Inventors: Turner Alfrey, Jr., Midland; Walter J. Schrenk, Bay City, both of Mich.

[73] Assignee: The Dow Chemical Company, Midland, Mich.

[22] Filed: Jan. 14, 1971

[21] Appl. No.: 106,459

Related U.S. Application Data

[63] Continuation-in-part of Ser. No. 876,181, Nov. 26, 1969, abandoned, which is a continuation of Ser. No. 562,220, July 1, 1966, abandoned.

[52] U.S. Cl. .....................350/1, 99/174, 117/33.3, 117/72, 161/2, 350/166
[51] Int. Cl. .............................................G02b 5/28
[58] Field of Search...................350/1, 163–166; 117/33.3, 72, 159; 161/2, 1, 408, 409; 96/84; 99/174

[56] References Cited

UNITED STATES PATENTS

| 3,480,502 | 11/1969 | Schrenk | 350/166 UX |
| 2,624,239 | 1/1953 | Blout et al. | 350/1 UX |
| 3,558,330 | 1/1971 | Widiger et al. | 99/174 |
| 2,331,716 | 10/1943 | Nadeau et al. | 350/164 X |
| 3,276,943 | 10/1966 | Kawamura | 350/1 UX |
| 3,487,505 | 1/1970 | Chisholm et al. | 350/166 UX |

FOREIGN PATENTS OR APPLICATIONS

| 578,275 | 6/1959 | Canada | 350/164 |
| 499,387 | 4/1937 | Great Britain | 350/166 |
| 742,530 | 12/1955 | Great Britain | 350/166 |

*Primary Examiner*—David Schonberg
*Assistant Examiner*—Toby H. Kusmer
*Attorney*—Richard G. Waterman et al.

[57] ABSTRACT

Highly reflective colored plastic film is prepared from transparent plastics having no pigment or inorganic material by forming the film from a number of layers of different thermoplastic materials which differ in refractive index and the layer thicknesses are from about 0.05 micron to about one micron.

16 Claims, 6 Drawing Figures

INVENTORS.
Turner Alfrey, Jr.
Walter J. Schrenk

HIGHLY REFLECTIVE THERMOPLASTIC BODIES FOR INFRARED, VISIBLE OR ULTRAVIOLET LIGHT

This application is a continuation-in-part of our co-pending application, Ser. No. 876,181, filed Nov. 26, 1969, now abandoned which in turn was a continuing application of our earlier filed application, Ser. No. 562,220, filed July 1, 1966, now abandoned.

This invention relates to plastic bodies, and more particularly relates to plastic bodies comprising a plurality of layers.

Plastic films are widely employed for packaging, for temporary windows and for many decorative applications. Oftentimes, such plastic films are dyed or pigmented to provide a desirable color or optical characteristics. Frequently, plastic film is vacuum metallized; that is, a thin layer of a highly reflective metal, such as aluminum, is deposited on the surface of the film to provide an optical effect equivalent to that of a mirror. Beneficially, in most instances, such a layer is further covered by an additional protective layer to prevent oxidation or discoloration of the metal surface. Such layers are relatively expensive and time consuming to apply to plastic film and require precise control of conditions and expensive machinery which produces relatively little metallized film per cubic foot occupied by the equipment required for the metallizing operation. Oftentimes, it is desired that plastic films be colored to provide decorative or utilitarian effects. Usually, the coloring of such plastic films involves the addition of dyes or pigments to the polymer from which the material is subsequently extruded or cast, or occasionally dying a film, which has been prepared by conventional extrusion or casting techniques. Such dying operations generally are often unsatisfactory, expensive, time consuming and oftentimes are not readily reproducible. With the addition of dyes and pigments to a polymeric base and subsequent heat fabrication of the mass, the appearance of the resultant plastic sheet is oftentimes less than that which is desired. Similarly, other shaped plastic articles present problems in coloration or appearance which are generally commensurate with those encountered in the preparation of plastic film. The dyes and pigments available oftentimes provide less than the desired range of hue, purity and brightness.

In the fabrication of plastic articles, considerable difficulty is encountered in changing colors of a product; for example, in the extrusion of a film or in the injection molding of the parts, changing from one color to another often results in a considerable waste of product and waste of time when the equipment is purged to eliminate visible traces of the previous color composition and to obtain a product which apparently contains only the second desired polymer composition. Oftentimes, the material and products obtained during a purge or the cleaning of the operating equipment is of little or no value because of the appearance of diverse color material in the end product. Such changeover is generally wasteful and time consuming.

Further, in the preparation of shaped plastic articles such as moldings or the extrusion of film or sheets, it is extremely difficult to provide adequate control of color in different portions of the object being prepared except by what in essence amounts to multiple molding techniques, wherein contrasting colors are obtained by what amounts to separate molding operations. Furthermore, by the use of dyes and pigments, it is difficult and oftentimes impossible to obtain in a plastic body the desired transmission or reflectance characteristics due to the inherent limitations of available dyes and pigments.

It is an object of this invention to provide an improved method for the preparation of plastic film.

A further object of this invention is to provide a method for the preparation of synthetic resinous thermoplastic bodies having a desired appearance without the use of dyes, pigments or metal films.

A further object of the invention is to provide a method for the preparation of thermoplastic synthetic resinous shaped articles having desired appearance and employing only substantially transparent materials.

Still another object of this invention is to provide an improved shaped synthetic resinous article having a brilliant colored appearance greater than that obtainable with dyes or pigments.

A further object of the invention is to provide a shaped synthetic thermoplastic resinous body having a metallic appearance without the use of a metallic layer.

Another object of the invention is to provide a shaped synthetic resinous body having a metallic luster and a colored appearance.

These benefits and other advantages in accordance with the present invention are achieved by preparing a synthetic thermoplastic resinous body having on its surface a composite layer, the composite layer comprising a plurality of layers, wherein adjacent layers differ from each other in refractive index by at least about 0.05, and the thickness of the layers is from about 0.05 microns to about 1 micron and the reflectance is at least about 40 percent of the incident light.

Such bodies are readily prepared by the simultaneous extrusion of a plurality of layers of transparent synthetic resinous materials wherein adjacent layers differ in refractive index by at least 0.05 and the layers, while in the thermoplastic state, are deformed to thicknesses varying between 0.05 micron and 1 micron.

Alternately, one may consider the thickness of the various layers within the film in terms of optical distance. By the term "optical distance" is meant the product of the refractive index by the thickness of the layers. In general, beneficially and advantageously reflective films are obtained when the optical thickness of the layers is from about $\lambda/4$ to about $4\lambda$ wherein $\lambda$ is the wave length of the light under consideration. It is essential that the thickness of the film and the wave length of the light be expressed in the same units when calculating layer thickness.

Beneficially, to provide the most intense color or reflectance, the thickness of all the layers is not maintained constant but the thickness varies; for example: in the case of a two-component body; that is, a body having alternating layers ABABABAB . . . , the layers A may be maintained at a constant thickness, while the layers B are increased in thickness away from the surface in a regular manner such that if the thickness of layers A is designated as t, the thickness of any layer B would then be $t_n = f(n)$, wherein n designates the $n^{th}$ layer from the surface, or both layers may increase in a monotonic manner. By proper choice of the thickness and refractive indexes of the polymers employed to prepare such a film, almost any desired hue, purity and brightness combination can be obtained. Reflectance can be extremely high and approaches that of the theoretical C colors (page 148, "Physical Aspects of Colour," by P. J. Bouma, published by N. V. Philips GLOEILAMPEN FABRIEKEN EINDHOVEN, The Netherlands).

By employing anti-reflective coatings to the surface of the multi-layer plastic bodies, the quality of the colors is further improved as the more or less random reflection of the visible spectrum by the first surface or first surface region is substantially reduced. Such a coating beneficially should have a refractive index between that of the plastic and air. By proper selection of suitable transparent resinous plastic materials, the number of layers required for such phenomenon can be reduced to as few as 50 when employing materials of high difference in refraction; however, optically effective films are prepared from materials having much less difference in refractive index when the number of layers is increased.

In any single body, the apparent color can be altered by changing the thickness of the layers in a regular or irregular manner; for example: in the extrusion of a film, embossing the film will alter the thickness of the layers in selected areas. Selective cooling as the film is stretched to its final form will provide a similar result; for example, a plurality of cooled areas may be provided by intermittent air-blasts and will provide a polkadot effect; selective cooling by means of a plurality of air-blasts will provide a striped effect wherein stripes lie in the direction of extrusion. In a similar effect, checks, plaids and the like may also be prepared.

One particularly advantageous embodiment of the invention is obtained when highly reflective layered film is prepared from plastic or elastomeric materials. For example: thermoplastic film may be readily prepared which has no apparent optical effects; that is, it does not have high reflectivity, by heating such a film to a temperature at which it can be stretched. Stretching of the film will permit thinning of the layers to a sufficient extent to provide optical effects. For example: if it is desired to provide a film having a high reflectivity in a narrow portion of the visible spectrum, film is readily prepared by extrusion of a suitable number of layers of materials which is too thick to provide optimum reflection in the visible range by raising of the temperature of the film to a point that will permit thermoplastic flow, the film then may be stretched to provide layers of optimum thickness to position a highly reflective region anywhere desired within the visible spectrum as well as the near ultraviolet and infrared. Thus, if optical reflection filters are desired, a configuration of layers to provide a desired width of high reflectivity may be fabricated by extrusion and at some later date the maximum reflection positioned in the visible spectrum by merely warming and stretching the film. Advantageously, film prepared in accordance with the present invention utilizing elastomeric materials may have varying reflective spectrum by simply stretching. As such combination is stretched, the region of high reflectivity moves toward the shorter wave lengths. Such highly reflective elastomeric film is convenient for optical filters and especially attractive in advertising displays wherein a sheet of such film is stretched repetitively by a mechanical device and has the appearance of continuously changing color from red through the spectrum to blue and as the sheet relaxes, the color appears to change from blue through the spectrum to red.

By way of further illustration, FIG. 1 shows the reflective spectrum of a multi-layer film having 10 layers wherein the odd layers have a thickness of 700 Angstroms and a refractive index of 1.6 and the even numbered layers in thickness of 746.5 Angstroms and a refractive index of 1.5 over a range of wave lengths from about 4000 Angstroms to about 6000 Angstroms.

The intensity of the reflection in the blue and green area peaks at about 0.2 or 20 percent and somewhat below 0.2 percent in the region of 6400 Angstroms.

Figure 2:
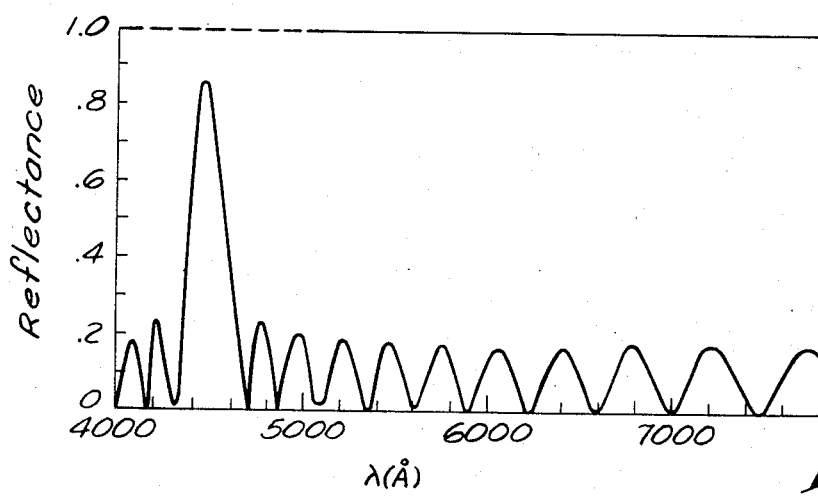

FIG. 2 illustrates the reflective spectrum of a film composite of 50 layers wherein the odd layers have a refractive index of 1.6 and a thickness of 700 Angstroms and all even layers have a refractive index of 1.5 and a thickness of 746.5 Angstroms. Various minor peaks occur and all have a reflectance of about 0.2 with the exception of about 2 peaks which are about 0.22 to 0.23. Adjacent the main peak, at about 4500 Angstroms, the blue-green region, which is relatively narrow, has a maximum intensity of about 0.85 or 85 percent and it has a high intensity at a band width of about 300 Angstroms.

Figure 3:
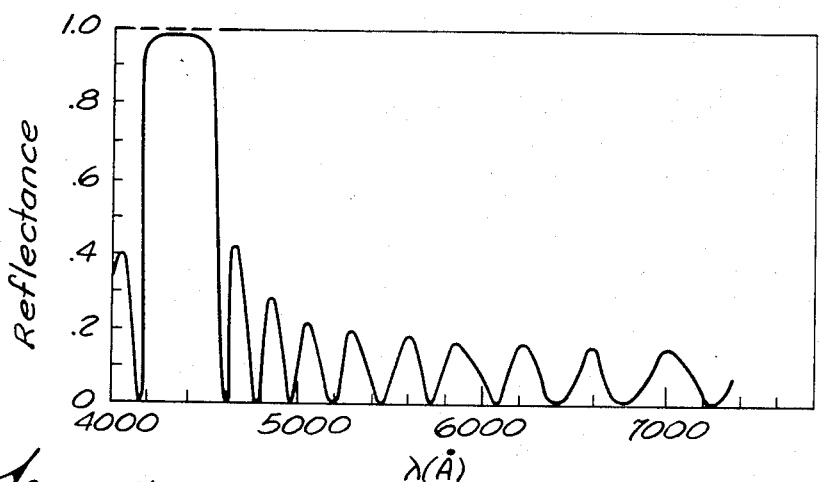

FIG. 3 shows the reflective spectrum of a 50 layer film, wherein the odd numbered layers have a refractive index of 1.6 and a thickness of 700 Angstroms. The even numbered layers have a refractive index of 1.4 and a thickness of 746.5 Angstroms. The peak reflectance is greater than 99 percent and exhibits a band width of 50 percent reflectance of about 400 Angstroms, giving a strong blue reflection. Minor peaks occur at about 4050 Angstroms to about 4650 Angstroms with an intensity of about 0.4. The remaining peaks rapidly diminish in intensity to about 15 percent at about 7000 Angstroms.

Figure 4:
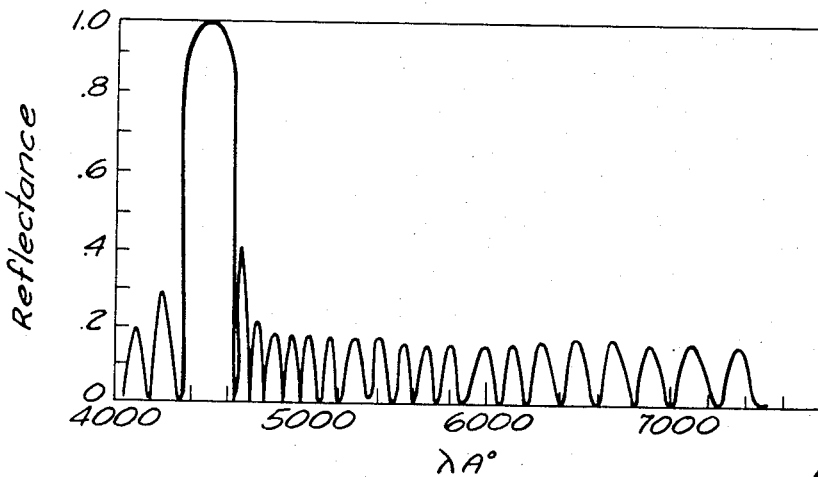

Employing a 100 layer film wherein the odd numbered layers have a refractive index of about 1.6 and a thickness of 700 Angstroms and the even numbered layers have a thickness of 745 Angstroms and a refractive index of 1.5, a reflective spectrum such as is illustrated in FIG. 4 is provided. A sharp peak which approaches 100 percent reflectance has a 50 percent reflectance, band width of about 250 Angstroms. Two minor secondary peaks are maintained, one at about 4250 Angstroms having an intensity of about 28 percent and a sharp minor peak at about 4650 Angstroms having an intensity of about 42 percent. The remaining peaks diminish to 15 percent at about 7350 Angstroms.

Figure 5:
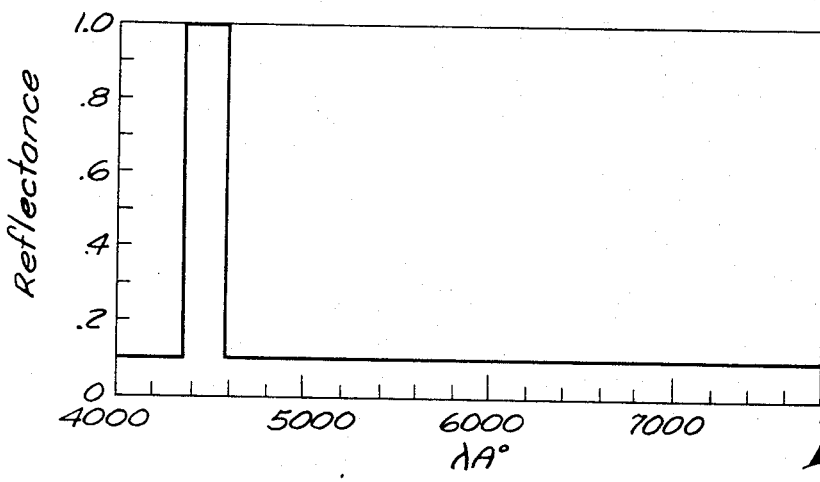

In FIG. 5 there is plotted an equivalent reflection spectrum of the curve of FIG. 4, as one might except the human eye to respond; thus, as can be readily seen, the low level reflective peaks through the visible spectrum substantially disappear and become the equivalent of about 0.1, the reflection of white light with a strong blue band center about 4450 Angstroms. If the number of layers in the film is increased from 100 to 250 to 400 or even 600, the apparent reflected spectrum approximates that of FIG. 5.

Figure 6:
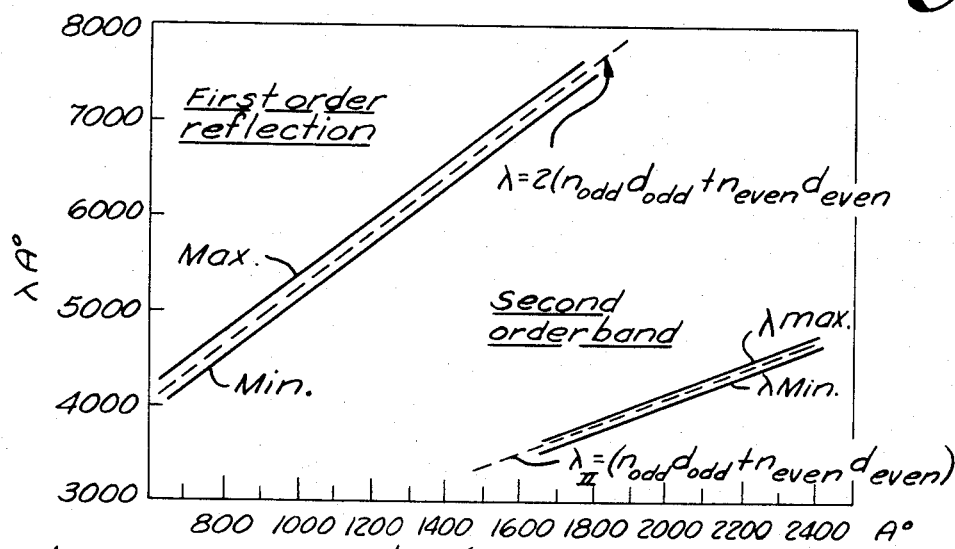

FIG. 6 is a plot of the position of the maximum peak against the thickness of the even layers. Thus, by altering the thickness of the layers, the position of the maximum peak of the reflective spectrum may be varied over substantially the entire visible spectrum. The peak is indicated by the dashed lines, while the solid lines lying on either side of the dashed lines indicate the band width at about 15 percent reflectance. The major second order peak is generally equivalent to the peak at about 4650 Angstroms of FIG. 4, and its band width is also depicted and indicated by the term "second order band."

The foregoing figures illustrate that relatively narrow intense band widths are obtained when a layered film is prepared wherein the alternating layers have a constant thickness.

By way of further illustration, a plurality of multi-layer films are provided wherein clear, uncolored polystyrene and polymethylmethacrylate are co-extruded in such a manner that the layers of polystyrene and polymethylmethacrylate alternate. The refractive index for polystyrene is 1.6 and the refractive index for polymethylmethacrylate is 1.49. The layers are increased in thickness in a regular manner. Sample (1) has 250 layers wherein one surface or outermost layer has a thickness of 700 Angstroms and is of polystyrene and is layer 1. Thus, the odd numbered layers are of polystyrene and the even numbered layers are of polymethylmethacrylate. The thickness of the polystyrene layers varies in accordance with the equation $T_s = 700 + 0.65n$ wherein $T_s$ is the thickness of the $n^{th}$ layer of composite which is polystyrene and $n$ is the number of the $n^{th}$ layer in the structure. $T_p$ is the thickness in Angstroms of the polymethylmethacrylate layers or even numbered layers; $T_p$ in Angstroms is equal to $746.5 + 0.693n$. The resultant 250 layer film has a high reflectivity between about 4500 Angstroms and 5500 Angstroms and exhibits an intense blue-green color.

A second sample of film is prepared also using polymethylmethacrylate and polystyrene in an arrangement similar to sample (1), with the exception that the thickness of the layers was altered in accordance with the equation $T_s = 607 + 0.564n$ and the polymethylmethacrylate was varied in accordance with the equation $T_p = 647 + 0.6n$. The resultant film exhibits a high reflectivity between about 3900 Angstroms and 4800 Angstroms and has an intense violet blue appearance.

A third sample is prepared in a manner similar to sample (1) wherein the layers are varied in accordance with the equation $T_s = 778 + 0.722n$ and $T_p = 830 + 0.77n$. The film exhibits a high reflectivity between about 5000 and 6100 Angstroms and has an intense yellow-green color.

A fourth sample is prepared wherein the layer thicknesses vary in accordance with the equations $T_s = 887 + 0.823n$, $T_p = 946 + 0.878n$. The resultant film has high reflectivity between 5700 Angstroms and 7000 Angstroms and has a bright orange appearance.

A fifth sample is prepared having 500 layers wherein the thickness of the layers is varied in accordance with the equations $T_s = 700 + 0.65n$ and $T_p = 746.5 + 0.693n$. The film prepared in this manner shows high reflectivity between about 4500 Angstroms and 6600 Angstroms and is generally green with a definite metallic appearance.

A multi-layer film is prepared employing multiple extrusion to provide a film having a total of 500 layers, 250 of the layers are a first block copolymer of 40 weight percent tertiary butylstyrene and 60 weight percent butadiene. The refractive index of the first copolymer is 1.52. Two hundred fifty layers of the film are composed of a second block copolymer containing 70 weight percent styrene and 30 weight percent butadiene. The second block copolymer has a refractive index of 1.57. The layers of the first block copolymer are about 987 Angstroms in thickness and the layers of the second copolymer are about 945 Angstroms in thickness. The total film thickness is about 1.9 mils. The film shows a high reflectance at a wave length of about 6000 Angstroms, giving the film a strong red appearance. The film is stretched until thickness is about 1.1 mils. The film has a blue appearance. The film is permitted to relax and retain its original thickness. The colors of the spectrum lying between red and blue appear as the stress is relaxed. When the stress is completely relaxed, the film has its original red appearance. Stretching the film until the thickness is reduced to about 0.7 mil results in a transparent film. Other thermoplastic elastomers may be readily utilized for the preparation of elastomeric film including thermoplastic polyurethanes such as the urethane polymer sold under the tradename of "Estane" by the B. F. Goodrich Company.

In a manner similar to the foregoing illustrations, multiple layer film having almost any desired color or hue is prepared by the coextrusion of thermoplastic resinous materials. Ideally, for maximum reflection, the monatonically increasing pattern such as that employed with samples 1–5 gives rise to the maximum reflectivity. However, other sequences of layer arrangement give highly reflective optically attractive plastic film; for example: by extruding what might be considered a striped tube; that is, a tube comprising a matrix of a transparent thermoplastic material containing encapsulated therein stripes of a diverse thermoplastic transparent material which extend from a location generally adjacent the inner surface of the tube to a location adjacent the external surface of the tube into a die which has an external rotating die lip and an internal rotating mandrel. Film of apparently many layers is generated as the radially extending stripes are wound around the mandrel in a spiral pattern dependent on the relative speed of rotation of the die lips and the speed of extrusion. Generally, as the viscous drag is greater adjacent the surface of the tubes, the thickest apparent layers are disposed within the center and the thinner layers adjacent the external surfaces. By employing apparatus which has minor irregularities therein, multiple colored film of high reflectivity and extremely attractive appearance is obtained. Employing apparatus such as is disclosed in U.S. Pat. Nos. 3,195,865; 3,182,965 and 3,051,452, a fluid stream is divided and recombined in such a manner that the layers are not monotonically increasing in thickness, but the successive groups have monotonically increasing layers. Film employing this arrangement also provides high reflectivity and desirable coloring.

Film prepared in accordance with the present invention is employed with benefit for a wide variety of applications. Various comestibles sensitive to ultraviolet radiation are readily protected by over-wrapping in an ultraviolet reflecting film which is transparent to visible light. Meats (both fresh and processed), nuts, cheese and like comestibles which are altered by exposure to excessive amounts of ultraviolet radiation are protected and yet are readily visible for inspection.

If desired in accordance with the principles hereinbefore set forth, film having two reflecting peaks is prepared, one peak in the visible spectrum and one peak in the near ultraviolet spectrum and a colored ultraviolet reflecting film is obtained. For many applications, film having strong reflection in the infrared is very useful as a heat shield and is employed to replace metallic foil in heat insulating applications. Beneficially, such film is often laminated to a supporting substrate such as paper and the like. Advantageously, when employed for heat insulating purposes, plastic film offers substantial advantage over metal foils such as aluminum foil. Plastic film can be crumpled, wrinkled and the like without great change in its moisture vapor barrier characteristics, whereas most aluminum foil or wrinkling loses its moisture vapor barrier properties. A further advantage is that a plastic or synthetic resinous fiber is generally much more corrosion resistant when exposed to moist, chemically contaminated air.

Infrared reflecting film of the present invention (transparent to at least a portion of the visible spectrum), is employed with particular benefit in glazing. Undesired infrared radiation is reflected while all or a desired portion of the visible spectrum is reflected, a situation which is particularly desirable when an enclosed space is to be cooled; for example: in an air conditioned building or vehicle. For many applications, such as glazing, it is desirable to laminate the reflecting plastic film to a substrate, such as conventional window glass, to provide mechanical strength and oftentimes scratch resistance and/or chemical resistance. Infrared reflecting film is readily incorporated within the plastic layer of conventional safety glass; for example: a 20 mil thick layer of polyvinylbutyral is deposited on each of two sheets of glass and a 6 mil thick layer of infrared reflecting film is placed between the polyvinylbutyral layers and adhered thereto.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A highly reflective synthetic resinous thermoplastic body of at least first and second diverse thermoplastic transparent materials, the body having at least a first surface, the body comprising at least a total of fifty synthetic resinous thermoplastic layers of the first and second materials, each of the layers being transparent to at least infrared, visible or ultraviolet light, wherein the adjacent layers differ from each other in refractive index by at least 0.05 and the thickness of the layers is from about 0.05 micron to about one micron and the thickness of at least a portion of the first layer increases in a direction away from the first surface and the reflection spectrum of the layered film reaches a value of at least 40 percent within the region of infrared, visible or ultraviolet light.

2. The body of claim 1 having a reflective spectrum approaching that of a C color.

3. The body of claim 1 wherein the body has a metallic appearance.

4. The body of claim 1 whereby the layers of the first and second material vary in thickness.

5. The body of claim 1 wherein the layers of the second material are arranged in a generally increasing thickness away from the first surface.

6. The body of claim 1 wherein the plurality of layers are varied in thickness by stretching.

7. The body of claim 6 wherein the materials are elastomeric in nature.

8. The body of claim 1 wherein the first surface is adhered to a glass sheet.

9. The body of claim 8 having a second surface adhered to a glass sheet.

10. The body of claim 1 wherein the body has the form of a film and the film encloses a comestible.

11. The body of claim 10 wherein the comestible is a meat.

12. The body of claim 1 wherein the major reflection is in the infrared region.

13. The body of claim 12 wherein the first surface is adhered to a substrate.

14. The body of claim 13 wherein the substrate is paper.

15. A highly reflective synthetic resinous thermoplastic film of at least first and second diverse transparent thermoplastic materials, the body having at least a first surface, the body comprising at least a total of fifty synthetic resinous thermoplastic layers of the first and second materials, each of the layers being transparent to at least infrared, visible or ultraviolet light, wherein the adjacent layers differ from each other in refractive index by at least 0.05 and the thickness of the layers is from about 0.05 micron to about one micron and the thickness of at least a portion of the first layer increases in a direction away from the first surface and the reflection spectrum of the layered film reaches a value of at least 40 percent within the region of infrared, visible or ultraviolet light, and the film is variable in thickness by stretching.

16. The film of claim 15 wherein the components are elastomeric in nature.

* * * * *